(12) United States Patent
Turki et al.

(10) Patent No.: US 11,347,991 B1
(45) Date of Patent: May 31, 2022

(54) IDENTIFICATION DEVICES

(71) Applicant: Omni-ID Corporation, Inc., East Rochester, NY (US)

(72) Inventors: Badredin Turki, Farnham (GB); Charles Vilner, Crawley (GB); Vijay Kumar, Navi Mumbai (IN); Anthony Victor Kington, Hampshire (GB)

(73) Assignee: Omni-ID Corporation, Inc., East Rochester, NY (US)

( * ) Notice: Subject to any disclaimer, the term of this patent is extended or adjusted under 35 U.S.C. 154(b) by 0 days.

(21) Appl. No.: 17/188,244

(22) Filed: Mar. 1, 2021

(51) Int. Cl.
  *G06K 19/077* (2006.01)
(52) U.S. Cl.
  CPC . *G06K 19/07758* (2013.01); *G06K 19/07773* (2013.01)
(58) Field of Classification Search
  CPC .................................................. G06K 19/07758
  USPC .......................................................... 235/492
  See application file for complete search history.

(56) References Cited

U.S. PATENT DOCUMENTS

| | | | |
|---|---|---|---|
| 2012/0018652 A1* | 1/2012 | Yoder | G01T 1/105 250/484.2 |
| 2013/0196787 A1* | 8/2013 | Luciano, Jr. | A63B 45/00 473/371 |
| 2017/0172701 A1* | 6/2017 | Kube | A61B 90/98 |
| 2018/0276428 A1* | 9/2018 | Kakani | G06Q 10/087 |
| 2019/0303630 A1* | 10/2019 | Raptis | G06K 7/10128 |
| 2019/0387848 A1* | 12/2019 | Leybourn | H04W 4/80 |
| 2020/0342280 A1* | 10/2020 | Mei | G06K 19/0726 |
| 2020/0380329 A1* | 12/2020 | Lin | G06K 19/07749 |
| 2020/0405239 A1* | 12/2020 | Trabish | A61B 5/4023 |
| 2021/0231471 A1* | 7/2021 | Picot | G01F 1/075 |

* cited by examiner

*Primary Examiner* — Allyson N Trail
(74) *Attorney, Agent, or Firm* — McDonnell Boehnen Hulbert & Berghoff LLP

(57) ABSTRACT

Described examples relate to a radio frequency identification (RFID) device configured to be detachably coupled to an object. The RFID device may include a first RFID tag comprising a first antenna, the first antenna comprising a first arcuate element and a second arcuate element, wherein the first accurate element and second arcuate element are arranged in a semicircle. The RFID device may also include a second RFID tag comprising a second antenna.

20 Claims, 5 Drawing Sheets

IDENTIFICATION DEVICES

FIELD OF THE INVENTION

The present application generally relates to identification devices, and more specifically, to Radio-frequency identification (RFID) devices configured to be coupled to an object.

BACKGROUND

Radio Frequency Identification (RFID) systems are widely used for identifying and tracking objects. RFID systems typically include RFID devices and RFID readers (e.g., interrogating devices) for reading and/or writing information to/from the RFID devices. RFID systems are particularly useful in the management of objects being stored, processed, transported, and/or handled. For example, an RFID device may be placed on or attached to an object to be tracked. The RFID device typically includes an antenna and an integrated circuit (IC) that can store information about the tracked object. The RFID device may be passive, in which the RFID device is powered by an electromagnetic field used to read the RFID device, or active in which the RFID device contains a power source.

One application for the use of RFID devices is in industries that employ reusable containers for storing, transporting and dispensing consumable products, such as gas containers holding pressurized gas (e.g., oxygen, acetylene, nitrogen, and the like). Traditionally, identification plates or labels may be affixed to the gas containers to display identification information about the container. One disadvantage with this approach is that the gas containers tend to be relatively bulky and are not easily moved making the identification labels often difficult to read. Further, during transportation and use, the gas containers may be subjected to a wide variety of environmental conditions which may degrade the information on the identification labels. In addition, the gas containers are sometimes handled relatively roughly which tends to degrade, chip, or smear the information on the identification labels.

Due to the potential problems with using traditional identification plates for gas containers, it may be desirable to employ RFID devices for identifying and tracking gas containers. However, gas containers are typically made of metal or other conductive materials that tend to interfere with the propagation of RFID signals used by RFID readers to read RFID devices. For example, when an RFID device is attached to metallic and/or other types of conductive surfaces, the RFID device may be difficult to read and/or provide limited read range. As a result, tracking metal articles, such as gas containers, may be difficult to achieve with RFID devices and so other more expensive location systems may have to be employed, such as global positioning systems (GPS).

SUMMARY

The present application describes RFID devices that may be adapted to be attached to objects to be tracked. The RFID devices have a low profile and are designed to operate on conductive surfaces, such as metallic surfaces, etc. The RFID devices are also designed to prevent the RFID devices from becoming inadvertently detached from objects. Further, the RFID devices are durable and are resistant to harsh environmental and handling conditions.

In one aspect, the present application describes a radio frequency identification (RFID) device configured to be detachably coupled to an object. The RFID device may include a first RFID tag comprising a first antenna, the first antenna comprising a first arcuate element and a second arcuate element, wherein the first arcuate element and second arcuate element are arranged in a semicircular pattern. The RFID device may also include a second RFID tag comprising a second antenna.

In another aspect, the present application describes an identification device comprising a first RFID tag comprising a semicircular antenna, the semicircular antenna comprising a first arcuate element and a second arcuate element. The identification device may also include a second RFID tag comprising an antenna.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Example apparatus are described herein. It should be understood that the words "example," "exemplary," and "illustrative" are used herein to mean "serving as an example, instance, or illustration." Any implementation or feature described herein as being an "example," "exemplary," and/or "illustrative" is not necessarily to be construed as preferred or advantageous over other implementations or features. Thus, other embodiments can be utilized and other changes can be made without departing from the scope of the subject matter presented herein. Accordingly, the example embodiments and implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. Unless otherwise noted, the figures are not drawn to scale. Further, like reference numbers in the figures refer to like elements throughout the figures.

The present application describes identification devices or RFID devices (e.g., transponders) configured to be attached to objects or articles to be tracked. The RFID tags may be passive devices that derive power from signals of the RFID readers or active devices that include internal power sources. The RFID devices may be associated with objects for a variety of purposes including, but not limited to, tracking inventory, tracking status, collecting payments, billing customers, determining location information, temperature monitoring and other sensing applications, etc.

The RFID devices may be adapted to be attached to objects having conductive surfaces, such metal or steel surfaces. The RFID devices may also be flexible to enable the RFID devices to conform to the shape of the tracked objects. Further, the RFID devices may have a low profile to prevent the RFID devices from becoming detached from the objects. In addition, the RFID devices may be resistant to harsh environmental conditions, careless or improper handling of the tracked objects, and/or contact with fluids, such as water.

Figure 1:
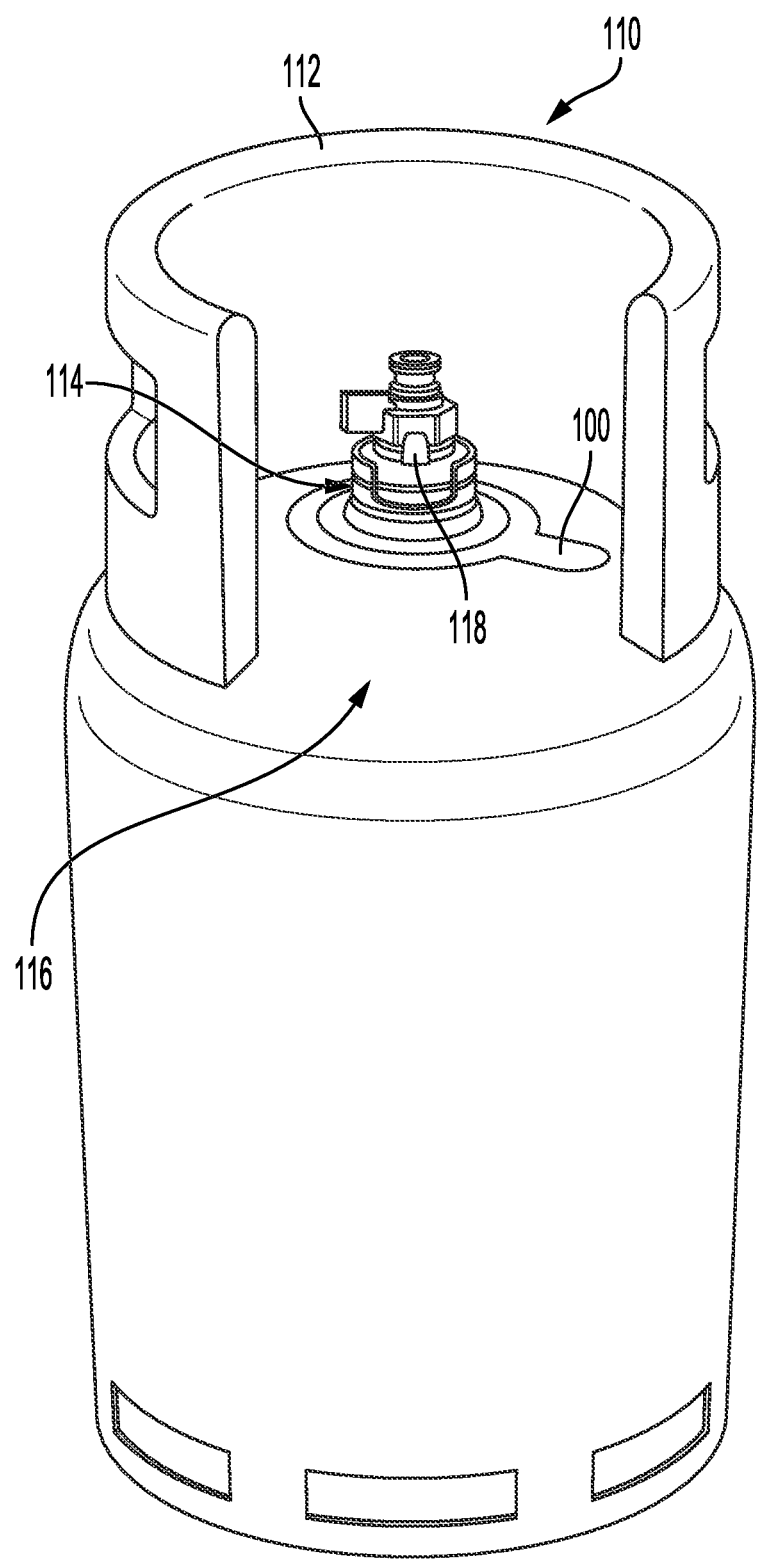
FIG. 1 illustrates a perspective view of a container with a RFID device affixed to an upper surface of the container, according to an example implementation.

Referring now to the figures, FIG. 1 shows a RFID device 100, which could alternatively be a transponder, attached to an upper surface of a container 110, according to an example embodiment. The container 110 may have an elongated, generally cylindrical body and may be made with rigid material, such as steel or metal. The container 110 may contain propane gas, natural gas, oxygen gas, hydrogen gas, or any other gas or material.

The container 110 may have a collar 112 and a valve assembly 114. The collar 112 may be mounted to the upper surface of the container 110 and may be configured to help protect the valve assembly 114 during storage, transportation, and handling. In some embodiments, the collar 112 could provide one or more handles. The collar 112 may be designed to define an open section 116 to allow access to the valve assembly 114. The valve assembly 114 may control the flow of material or gas into and out of the container 110 via a valve stem 118 (e.g., an outlet port). The valve stem 118 of the valve assembly 114 may face toward the open section 116.

As shown in FIG. 1, the RFID device 100 may be adapted to be placed on or attached to the container 110. For example, an adhesive may be used to affix the RFID device 100 to the upper surface of the container 110. In one example embodiment, the RFID device 100 may be fabricated with an adhesive backing that may be used to attach the RFID device 100 to the container 110. The adhesive backing may hold the RFID device 100 in a fixed position and may prevent detachment of the RFID device 100 from the container 110. In some embodiments, the RFID device 100 maybe fitted inside a pre-defined recess defined in the container 110 to provide extra security and safety for the device, as the structure or body of the RFID device 100 will conform to the surface of the container 110.

Further, the RFID device 100 may be designed with a low profile so that the RFID device 100 may not obstruct or hinder various processes that the container 110 may undergo during its life cycle, such as refilling, handling, transporting, storing, connecting and/or disconnecting a regulator or hose, etc. In one example embodiment, the RFID device 100 may be configured to be positioned around the valve assembly 114 of the container 110. For example, the RFID device 100 may be installed on the upper surface of a container 110 encircling the valve assembly 114 as shown in FIG. 1. By attaching the RFID device 100 on the upper surface of the container 110, the RFID device 100 may avoid or reduce contact from external articles during handling and transport, such as impacts with other containers. Further, the RFID device 100 may not be damaged or become detached if the container 110 is knocked over.

The RFID device 100 enables the container 110 to be tracked while the container 110 is stored in inventory and during inspection, handling and use. For example, an RFID reader or interrogator (not shown) can read information stored by the RFID device 100 by transmitting an electromagnetic signal to interrogate the RFID device 100. The RFID device 100 can respond by transmitting information to the RFID reader. The information can include an identifier associated with container, such as a serial number or cylinder ID, and other information, such as container type, weight, contents, and/or product information. The identifier obtained by the RFID reader may then be compared to entries of container identifiers in a database for identification and tracking purposes. The RFID reader may also display the information obtained from the RFID device 100 to a user.

Figure 2:
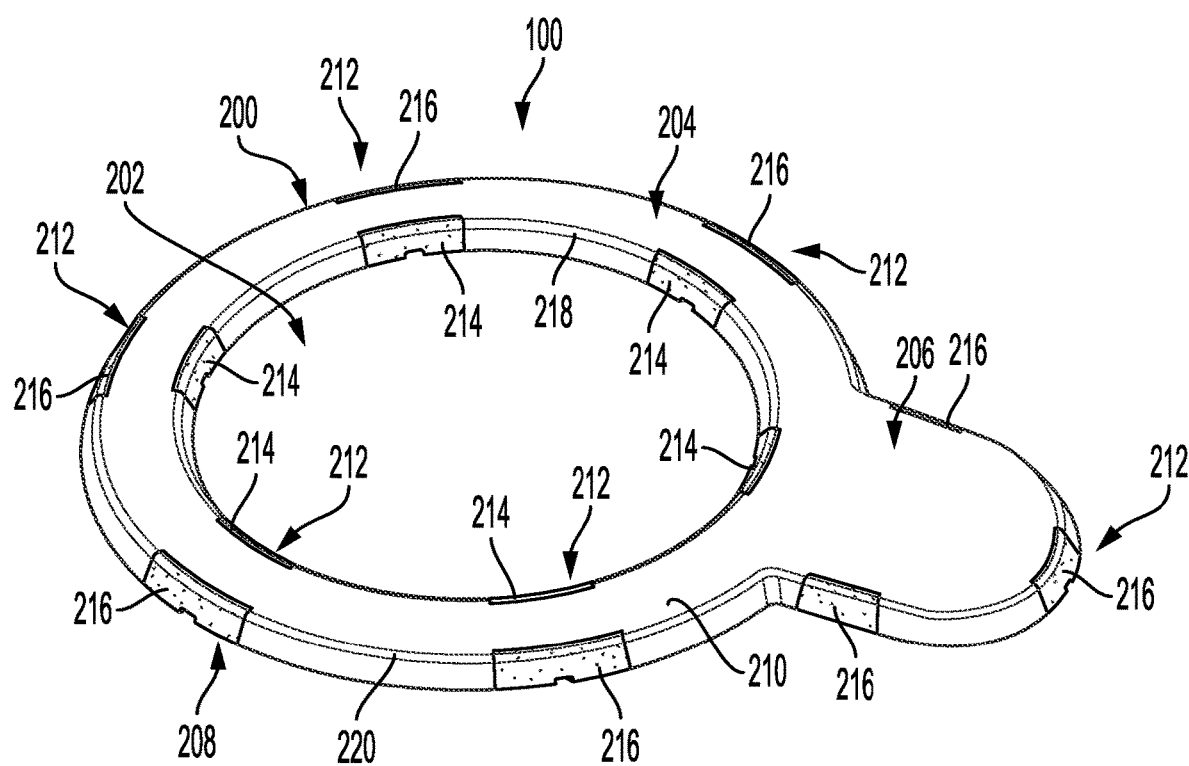
FIG. 2 illustrates a housing of a RFID device, according to an example implementation.

As shown in FIG. 2, the RFID device 100 includes a housing or casing 200, which encloses or encapsulates at least one RFID tag having an antenna and an integrated circuit (not shown) as further described below. The housing 200 provides the at least one RFID tag with protection from potential damage during handling and transportation of the container 110, such as dropping the container and/or other improper handling. For example, the housing 200 may be designed to absorb forces, such as impacts, without shattering or breaking. Further, the housing 200 may be configured to protect the at least one RFID tag from environmental conditions, contaminants, water, and temperature.

The housing 200 may be molded from a plastic or polymeric material and may be manufactured according to known injection molding or ultrasonic welding techniques. In some exemplary embodiments, an adhesive layer can be used to join upper and lower portions or cases of the housing together. Further, the housing 200 may be designed with a low profile so that it will not interfere with the handling of the container 110 and may help prevent the housing 200 from being inadvertently detached from the container 110. The housing 200 may have a thickness of $\lambda_d/10$ or less, $\lambda_d/100$ or less, or $\lambda_d/1000$ or less, where $\lambda_d$ is the wavelength in the dielectric material. In one example embodiment, the housing 200 may have a thickness of about 3.2-3.5 mm Further, the housing 200 may be configured to be flexible to enable the housing 200 to be affixed to uneven or curved surfaces. For example, the housing 200 may conform to the upper curved shape of the container 110 as shown in FIG. 1. The housing 200 may also include shape retention attributes or properties for retaining the housing 200 in the shape of the object (e.g., container) that the housing 200 is attached to. The shape retention attributes of the housing 200 may improve the attachment of the housing 200 to the surface of the container 110 and prevent the housing 200 from becoming separated or removed from the container 110.

As shown in FIG. 2, the housing 200 may having a substantially annular or cylindrical shape. For example, the housing 200 may be configured in a substantially circular shape with an opening or aperture 202 extending therethough. In one example embodiment, the housing 200 may comprise a substantially circular ring 204 (e.g., a ring member). The width of the circular ring 204 may be $\lambda_d/8$ or less or $\lambda_d/10$ or less and the thickness of the circular ring 204 may have a thickness of $\lambda_d/10$ or less, $\lambda_d/100$ or less, or $\lambda_d/1000$ or less. In one example embodiment, the width of the circular ring 204 may be about 11.1 mm and the circular ring 204 may have a thickness of about 3.5 mm. Further, the outer diameter of the circular ring 204 may be about 93.1 mm, $\lambda_d$ or less, $\lambda_d/2$ or less, or $\lambda_d/4$ or less and the diameter of the opening 202 of the circular ring 204 may be about 68.3 mm, $\lambda_d/2$ or less, or $\lambda_d/4$ or less.

The housing 200 may include a tab portion or flange 206, which integrally extends outwardly from the circular ring 204. The tab portion 206 of the housing 200 may be slightly curved or bent to conform to the outer surface of the container 110 to further prevent the removal of the housing 200 from the container 110. In one example embodiment, the tab portion 206 of the housing 200 may encase or house at least one RFID tag (not shown) as further described below. The tab portion 206 may have a length of about 27.4 mm and a width of about 33.1 mm. The size of the table portion 206 may vary to accommodate the size and the shape of different antenna structures. Further, the tab portion 206 may have the same thickness or greater than the circular ring 204 of the housing 200. In one example embodiment, the tab portion 206 may have a thickness of about 1.2 mm.

As shown in FIG. 2, the housing 200 may have a two-piece construction including a base layer (e.g., a PC, ABS or similar core) 208 and a cover layer or top 210. One or more RFID antennas or tags (not shown) may be mounted on or in the base layer 208 and the cover layer 210 may be molded over the RFID tags to encase or encapsulate the RFID tags within the base and cover layers 208 and 210. In other embodiments, the RFID antenna may be mounted on or in the cover layer 210 with the base layer 208 added using an adhesive layer or ultrasonic welding. The base layer 208 may comprise a polycarbonate material and the cover layer 210 may comprise an acrylonitrile butadiene styrene (ABS) material. In other example embodiments, the base layer 208 and cover layer 210 may be composed of the same material or any other suitable material. The base layer 208 and cover layer 210 may have a thickness of about $\lambda_d/10$ or less, $\lambda_d/100$ or less, or $\lambda_d/1000$ or less. In one embodiment, the base layer 208 may have a thickness of about 2 mm and the cover layer 210 may have a thickness of 1 mm.

The cover layer 210 of the housing 200 may have a plurality of pairs of oppositely opposed tabs or fingers 212 that are spaced apart and extend circumferentially around the housing 200 to secure the cover layer 210 to the base layer 208. As shown in FIG. 2, the cover layer 210 may include seven (7) pairs of oppositely opposed tabs 212. Each pair of the tabs 212 may have an inner tab 214 that engages with an inner edge of the base layer 208 and an outer tab 216 that engages with an outer edge of the base layer 208. As such, the base layer 208 may snap-fit into the cover layer 210 to form the housing 200. In other embodiments, the housing 200 may have a one-piece construction. For example, one or more RFID antennas or tags may be encapsulated in a liquid resin which may be subsequently cured to form the housing 200 of the RFID device 100.

Figure 3:
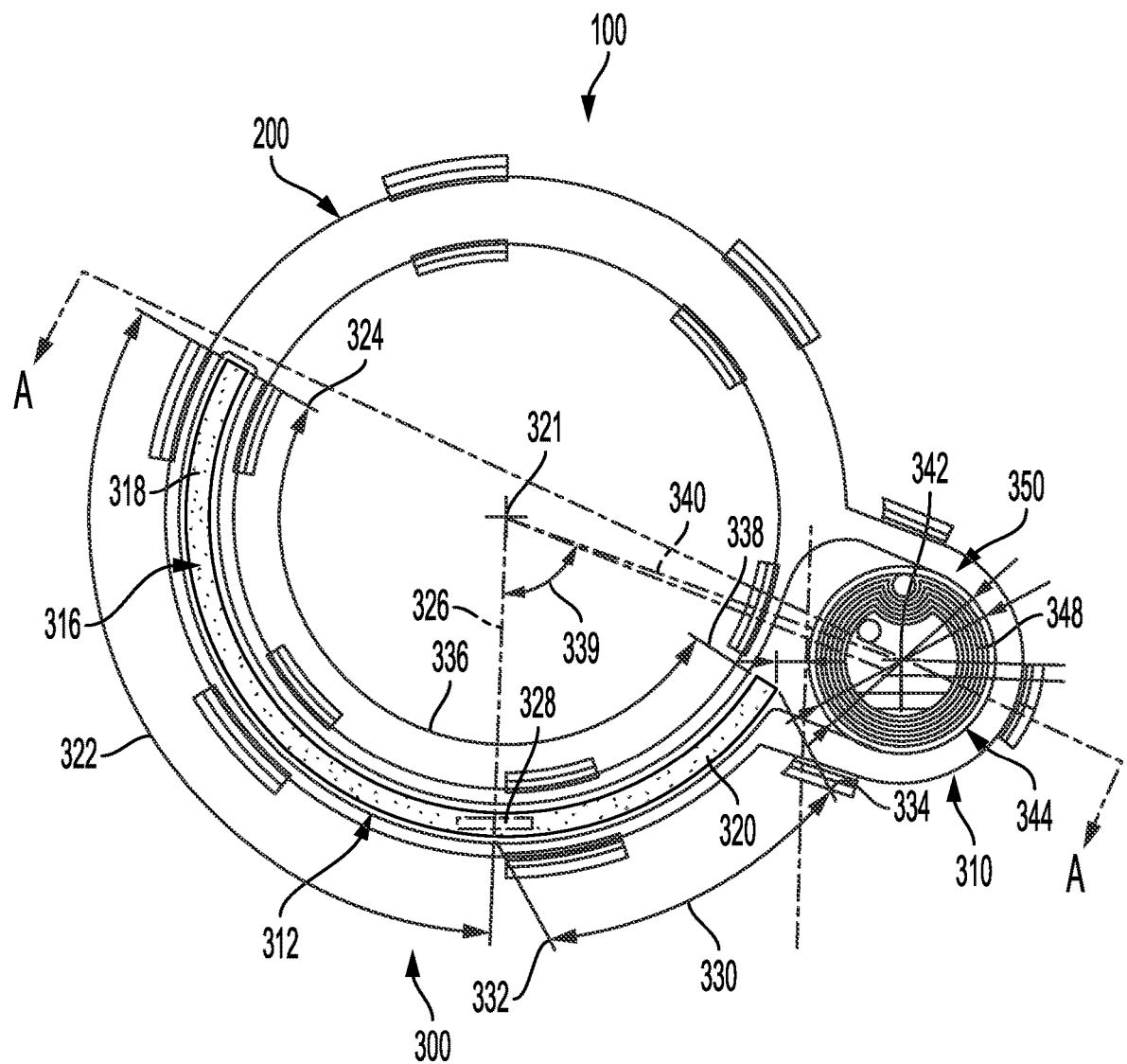
FIG. 3 illustrates a schematic transparent layout view of the RFID device of FIG. 2.

Referring to FIG. 3, the RFID device 100 includes a first RFID tag or inlay 300 and a second RFID tag or inlay 310. The first and second RFID tags 300 and 310 may be configured to store information in nonvolatile memory. The first and second RFID tags 300 and 310 may provide the information to an RFID reader (not shown) for identifying, tracking, and monitoring objects or containers associated with the RFID device 100. The information may include, but is not limited to, a unique serial number or product related information, such as a cylinder ID, a stock number, a batch number, a production date, and the like, and may include information regarding the type of gas, the identity of the customer, environment monitoring, etc.

Figure 4:
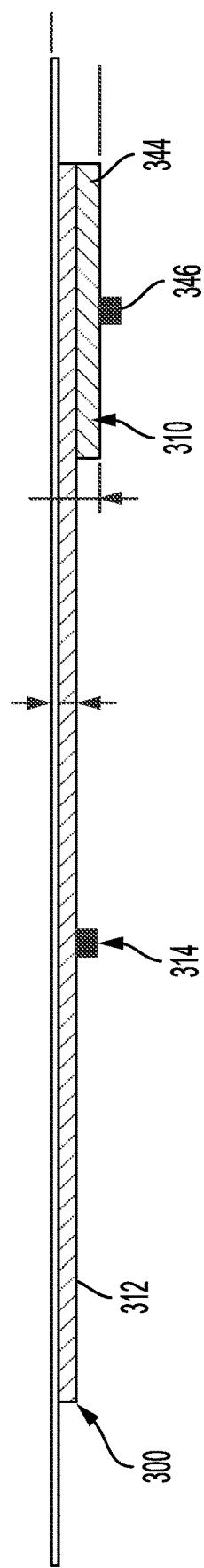
FIG. 4 is a cross-sectional view of the layout of the RFID device of FIG. 3 taken along line A-A.

As shown in FIGS. 3 and 4, the first RFID tag 300 of the RFID device 100 may include a substrate 312 having an integrated circuit 314 (e.g., a microchip) coupled to an antenna assembly 316 for transmitting electronically stored information. The integrated circuit 314 and antenna assembly 316 may be disposed on or embedded in the substrate 312. The substrate 312 may protect the antenna assembly 316 from environmental conditions and improper handling of the tracked object (e.g., the container 110). The substrate 312 may be flexible and may have a generally arcuate or curved shape to conform to the circular configuration of the housing 200. For example, substrate 312 may have an arc shape or C-shape that fits within a portion of the cylindrically shaped housing 200. The substrate 312 may comprise a polyethylene terephthalate (PET) substrate or any other suitable substrate. Further, the substrate 312 may be substantially flat or planar within about +/−10 degrees and may have a thickness of $\lambda_d/100$ or less or $\lambda_d/1000$ or less. In one example embodiment, the substrate 312 is about 0.17 mm.

The first RFID tag 300 may comprise a passive RFID tag that is powered by an electromagnetic field used to read the information stored in the integrated circuit 314 of the first RFID tag 300. In other example embodiments, the first RFID tag 300 may be designed as an active RFID tag by including an internal power source (e.g., a battery) to provide the power to operate the first RFID tag 300.

In one implementation, the first RFID tag 300 may comprise an ultra-high frequency (UHF) tag having an integrated circuit (e.g., microchip) and a UHF antenna assembly having a frequency range of between 860 to 960 MHz. The UHF microchip may comprise a NXP Ucode8 integrated circuit or any other suitable integrated circuit. In other example embodiments, the first RFID tag 300 may be designed to operate at a variety of frequencies, such as low frequencies (LF) at 125-134 kHz, high frequency (HF) at 13.56 MHz, or microwave frequencies at 2.4 and 5.8 GHz.

As shown in FIG. 3, the antenna assembly 316 of the first RFID tag 300 may have a curved structure, such as an arc shape or a C-shape, to fit on or within the curved portion of the substrate 312 and the housing 200. The antenna assembly 316 may include a dipole antenna having a first conductive element 318 and a second conductive element 320. The first conductive element 318 may have a substantial similar radius of curvature as the second conductive element 320 within about +/−10 degrees. Further, the first conductive element 318 may have a different lengths than the second conductive element 320. In other example embodiments, the antenna assembly 316 of the first RFID tag 300 may be a monopole, patch, slot antenna, or a quarter wave antenna.

The direction of the antenna directivity of antenna assembly 316 may be in a substantially upward vertical direction with respect to a ground surface when the RFID device 100 is mounted on the container 110 as shown in FIG. 1. For example, the antenna assembly 316 of the first RFID tag 300 may generate a vertical radiation pattern having a peak gain of a main lobe ±30 degrees near a central axis extending through a center 321 of the housing 200 of the first RFID tag 300. Further, the antenna assembly 316 may generate a horizontal radiation pattern having a peak gain directed in a horizontal direction parallel to the ground surface.

To achieve maximum performance, the antenna assembly 316 of the first RFID tag 300 may be located on the side of the housing 200 that is closest to the open section 116 defined by the collar 112 of the container 110 shown in FIG. 1. Further, the integrated circuit 314 of the first RFID tag 300 may be aligned with the center of the open section 116. In one example embodiment, the minimum radius (r) of the antenna of the antenna assembly 316 may be greater than $\lambda_d/4\pi$, where the effective radius (r) equals the length of value stem plus the distance required to achieve a minimum required read performance when the valve stub 118 is at any orientation in relation to open section 116.

As shown in FIG. 3, an angle 322 formed between a first imaginary straight line 324 and a second imaginary straight line 326 may be about 87 degrees. In some embodiments, the angle 322 may greater or less than 87 degrees depending on the outer diameter of the antenna assembly. The first imaginary straight line 324 extends through the center 321 of the housing 200 and through the outer end of the first conductive element 318 of the antenna assembly 316 and the second imaginary straight line 326 extends through the center 321 of the housing 200 and a center portion 328 of the integrated circuit 314 of the first RFID tag 300. An angle 330 formed between a third imaginary straight line 332 and a fourth imaginary straight line 334 may be about 44 degrees. The third imaginary straight line 332 intersects the second imaginary straight line 326 at an outer point of the housing 200 and the fourth imaginary straight line 334 extends through a corner of the second conductive element 320.

Further, an angle 336 formed between the first imaginary straight line 324 and a fifth imaginary straight line 338 may be about 121 degrees. The fifth imaginary straight line 338 extends through the center 321 of the housing 200 and through the outer end of the second conductive element 320 of the antenna assembly 316. An angle 339 formed between the second imaginary straight line 326 and a sixth imaginary straight line 340 may be about 72 degrees. The sixth imaginary straight line 340 extends through the center 321 of the housing 200 and a center 342 of the antenna assembly 316 of the second RFID tag 310. In other embodiments, the antenna assembly 316 may have different configurations to accommodate various designs of the cylinder.

In operation, fixed and/or handheld RFID readers (e.g., interrogation device) may be positioned above the RFID device 100 to read the first RFID tag 300. For example, the RFID readers may be positioned above the container 110 as shown in FIG. 1. The first RFID tag 300 may be configured to be read from a distance of about 5 meters or more with fixed RFID readers and may be read from a distance of about 3 m meters or more with the handheld RFID reader (e.g., mobile reader). The read range of first RFID device 100 may be increased or decreased depending on the application. For example, the integrated circuit 314 of the first RFID device may be configured to have any suitable read range. The RFID readers may communicate with the first RFID tag 300 by transmitting a modulated radio frequency signal through an interrogation antenna using a carrier frequency corresponding to a resonant frequency of the antenna assembly 316 of the first RFID tag 300. The antenna assembly 316 of the first RFID tag 300 may receive the signal and modulate a backscattered signal back the RFID readers. The signal may include information encoded in the memory of the integrated circuit 314 of the first RFID tag 300. The RFID readers may display the information to a user.

As shown in FIG. 3, the second RFID tag 310 of the RFID device 100 may include a substrate 344 having an integrated circuit 346 (e.g., a microchip) coupled to an antenna assembly or winding 348 for transmitting electronically information stored in the integrated circuit 346. The antenna assembly 348 and intergraded circuit 346 may be disposed on or within the substrate 344. The second RFID tag 310 may be designed to operate on conductive surfaces, such as metallic surfaces. Further, the substrate 344 may protect the antenna assembly 348 and the integrated circuit 346 from environmental conditions and improper handling of tracked objects (e.g., containers).

Further, the substrate 344 may be disposed in the tab portion 206 of the housing 200. As shown in FIG. 4, the substrate 344 of the second RFID tag 310 may be disposed below the substrate 312 of the first RFID tag 300. In some embodiments, the substrate 344 and the substrate 312 may be formed as one substrate. The substrate 344 of the second RFID tag 310 may be planar and have a substantially cylindrical shape. The substrate 344 may comprise a polyethylene terephthalate (PET) substrate or any other suitable substrate. The substrate 344 may be flexible and have a thickness of about 0.17 mm, $\lambda_d/100$ or less, or $\lambda_d/1000$ or less. Further, the substrate 344 may have an outer diameter of about 23 mm. In some embodiments, the outer diameter may be greater or less than 23 mm depending on the size and shape of the second RFID tag 310.

The second RFID tag 310 may comprise a passive RFID tag that is powered by an electromagnetic field used to read stored information. In other example embodiments, the second RFID tag 310 may comprise an active RFID tag having an internal power source (e.g., a battery). In one implementation, the second RFID tag 310 may include a high frequency (HF) tag comprising a HF integrated circuit and a HF antenna assembly. The HF antenna assembly may comprises a plurality of antenna loop windings (e.g., a coil or loop antenna). In one example embodiment, the plurality of antenna loop windings may substantially circular.

The second RFID tag 310 may be configured to communicate using a short-range wireless communication protocol, such as a near-field (NFC) communication standard. For example, the HF tag may include a NFC (HF) microchip and an antenna assembly having a frequency range of about 13.56 MHz. The NFC (HF) microchip may comprise a NXP/Ultralight EV1 (ISO 14443A) integrated circuit or any other HF microchip. In other example embodiments, the RFID tag may be able to communicate using other protocols and standards. In other implementations, the HF antenna assembly may be combined with the UHF antenna assembly of the first RFID tag 300 in a single substrate or inlay.

Figure 6:
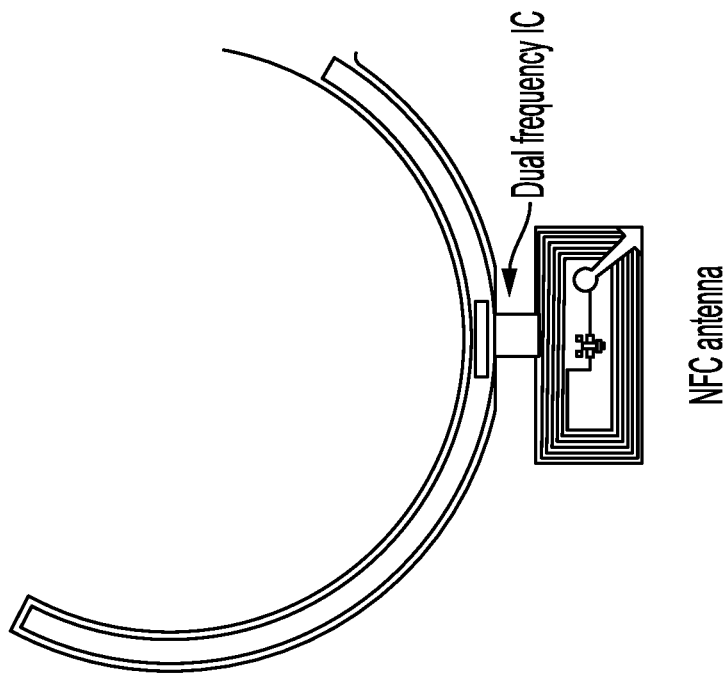
FIG. 6 illustrates a schematic transparent layout view of a RFID device, according to another example.
Figure 5:
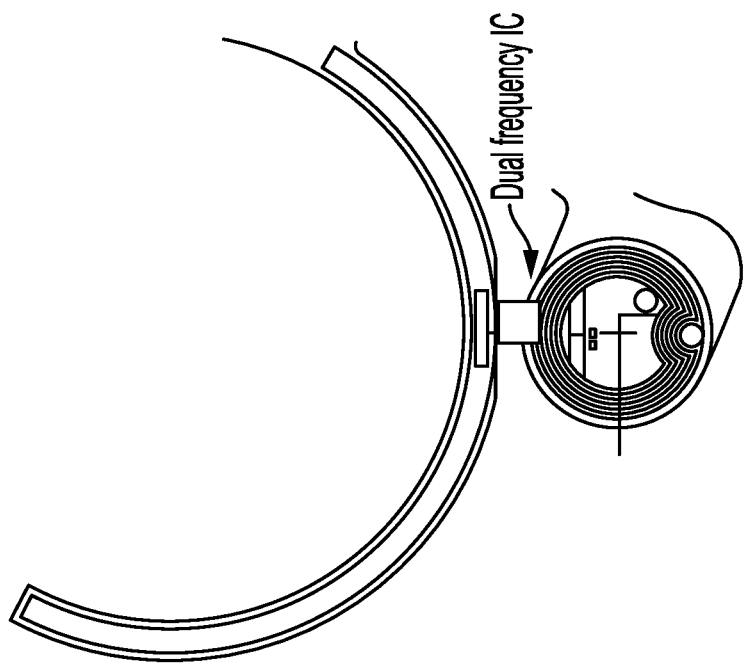
FIG. 5 illustrates a schematic transparent layout view of a RFID device, according to another example.

In some embodiments, the RFID device 100 may have a HF antenna, a UHF antenna, and a dual frequency integrated circuit as shown in FIGS. 5 and 6. The dual frequency integrated circuit may comprise an em|echo-V ("EM4425") integrated circuit or any other suitable dual frequency integrated circuit. The HF antenna may have a substantially circular shape as shown in FIG. 5 or a substantially rectangular shape as shown in FIG. 6.

In operation, a handheld RFID reader (e.g., interrogation device) may be positioned near the second RFID tag 310 of the RFID device 100. For example, the handheld RFID reader may be positioned above RFID device 100 attached to the container 110 shown in FIG. 1. The second RFID tag 310 may be configured to be read from a distance of up to 3 cm. The RFID handheld reader may communicate with the second RFID tag 310 by transmitting a modulated radio frequency signal to the second RFID tag 310. The antenna assembly 348 of the second RFID tag 310 may receive the signal and modulate a signal back causing a change in the reader magnetic field (e.g., inductive coupling). The signal may include information encoded in the memory of the integrated circuit 346 of the second RFID tag 310. The handheld RFID reader may display the information to a user. In one example, the handheld reader may comprise a mobile device.

As shown in FIG. 3, a shielding or absorbing member 350 may be placed between the second RFID tag 310 and the housing 200. The shielding member 350 may provide a separation between the container 110 and the antenna assembly 348 of the second RFID tag 310. As a result, the shielding member 350 may reduce the amount of energy that may reach the container 110 which can detune and deteriorate the radio frequency (RF) coupling between the antenna assembly of the second RFID tag 310 and a RFID reader. The shielding member 350 may be made of a magnetic material. In one example embodiment, the magnetic material may comprise a ferrite sheet or other suitable material. In other example embodiments, the shielding material may comprise plastic or wood. Further, the shielding member 350 may have a substantially cylindrical shape and may have a diameter of 25 mm. In some embodiments, the diameter of the shielding member 350 may be less or greater than 25 mm depending on the size of the second RFID tag 310. Further, the shield member 350 may be substantially planar within about +/−10 degrees and have a thickness of about 0.1 mm. The thickness of shield member 350 may be less than $\lambda_d/1000$. The thickness depends on the properties of the material of the shield member 350 and the separation between the antenna 348 and the metallic surface 116.

The above detailed description describes various features and operations of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A radio frequency identification (RFID) device configured to be detachably coupled to an object, the RFID device comprising:
   a housing comprising a flange portion and a substantially cylindrically shaped portion having an opening extending therethrough;
   a first RFID tag comprising a first antenna, the first antenna disposed within the substantially cylindrically shaped portion of the housing, wherein the first antenna comprising a first arcuate element and a second arcuate element, and wherein the first arcuate element and second arcuate element are arranged in a semicircular pattern; and
   a second RFID tag comprising a second antenna, wherein the second antenna is disposed within the flange portion of the housing.

2. The RFID device of claim 1, further comprising a first integrated circuit, wherein the first integrated circuit is coupled to the first antenna or the second antenna.

3. The RFID device of claim 1, wherein the first arcuate element is coplanar with the second arcuate element, wherein the first arcuate element has a radius of curvature that is substantially similar to the radius of curvature of the second arcuate element, and wherein the first arcuate element and the second arcuate element form a part of a circumference of a circular or oval shape.

4. The RFID device of claim 1, wherein the first antenna is substantially planar and the second antenna is substantially planar, and wherein the first antenna is positioned substantially parallel to the second antenna.

5. The RFID device of claim 1, wherein the first antenna comprises a dipole antenna, and wherein the second antenna comprises a loop antenna having a substantially circular or rectangular shape.

6. The RFID device of claim 1, wherein the housing is configured to conform to an outer surface of the object, and wherein the housing has a thickness in a range of approximately 3.2-3.5 mm or has a thickness less than $\lambda_d/10$, $\lambda_d/100$, or $\lambda_d/1000$.

7. The RFID device of claim 1, further comprising a housing having a base layer and a cover layer, wherein the first RFID tag and the second RFID tag are disposed between the base layer and the cover layer.

8. The RFID device of claim 7, wherein the base layer comprises a dielectric material, and wherein the cover layer comprises an acrylonitrile butadiene styrene (ABS) material.

9. The RFID device of claim 1, further comprising a housing having a base layer and a cover layer, wherein the first RFID tag comprises a first substantially planar substrate, wherein the first substantially planar substrate is disposed between the base layer and the cover layer, wherein the second RFID tag includes a second substantially planar substrate, and wherein the second substantially planar substrate is disposed between the base layer and the cover layer.

10. The RFID device of claim 9, wherein a portion of the first substantially planar substrate is disposed between the cover layer and the second substantially planar substrate.

11. The RFID device of claim 9, wherein at least one of the first and second planar substrates comprises a polyethylene terephthalate (PET) substrate, and wherein the second substantially planar substrate has a thickness greater than the first substantially planar substrate.

12. The RFID device of claim 1, wherein the first RFID tag is configured with a first read range and the second RFID tag is configured with second read range, wherein the first read range is greater than the second read range.

13. The RFID device of claim 1, wherein the first RFID tag comprises a passive RFID tag, and wherein the second RFID tag comprises a passive RFID tag.

14. The RFID device of claim 1, wherein the first antenna comprises an ultra-high frequency (UHF) antenna, and wherein the second antenna comprises a high frequency (HF) antenna.

15. The RFID device of claim 14, wherein the ultra-high frequency antenna (UHF) has a frequency range of 902 to 928 MHz, 860 to 870 MHz, or a combination thereof, and wherein the high frequency antenna (HF) has a frequency of 13.56 MHz.

16. The RFID device of claim 1, further comprising a shielding layer disposed between the second RFID tag and the housing.

17. The RFID device of claim 16, wherein the shield layer comprises a magnetic layer or a ferrite sheet.

18. An identification device comprising:
   a housing comprising a flange portion and a substantially cylindrically shaped portion having an opening extending therethrough;
   a first RFID tag comprising a semicircular antenna, wherein the semicircular antenna is disposed within the substantially cylindrically shaped portion of the housing, and wherein the semicircular antenna comprises a first arcuate element and a second arcuate element; and
   a second RFID tag comprising an antenna, wherein the antenna is disposed within the flange portion of the housing.

19. The identification device of claim 18, further comprising a shielding layer disposed between the second RFID tag and the housing.

20. The RFID device of claim 19, wherein the shield layer comprises a magnetic layer or a ferrite sheet.

* * * * *